(12) United States Patent
Lai et al.

(10) Patent No.: US 11,265,400 B2
(45) Date of Patent: Mar. 1, 2022

(54) MULTIMODE INTERCONNECTION INTERFACE CONTROLLER FOR CONVERGED NETWORK

(71) Applicant: NATIONAL UNIVERSITY OF DEFENSE TECHNOLOGY, Hunan (CN)

(72) Inventors: Mingche Lai, Hunan (CN); Liquan Xiao, Hunan (CN); Junsheng Chang, Hunan (CN); Pingjing Lu, Hunan (CN); Zhengbin Pang, Hunan (CN); Canwen Xiao, Hunan (CN); Lu Liu, Hunan (CN); Jijun Cao, Hunan (CN); Yi Dai, Hunan (CN); Jiaqing Xu, Hunan (CN); Qiang Wang, Hunan (CN); Fangxu Lv, Hunan (CN)

(73) Assignee: NATIONAL UNIVERSITY OF DEFENSE TECHNOLOGY, Hunan (CN)

(*) Notice: Subject to any disclaimer, the term of this patent is extended or adjusted under 35 U.S.C. 154(b) by 0 days.

(21) Appl. No.: 17/109,152

(22) Filed: Dec. 2, 2020

(65) Prior Publication Data
US 2021/0360093 A1    Nov. 18, 2021

(30) Foreign Application Priority Data
May 13, 2020    (CN) .......................... 202010402731.4

(51) Int. Cl.
H04L 29/06    (2006.01)
H04L 1/00    (2006.01)
(Continued)

(52) U.S. Cl.
CPC ............ *H04L 69/24* (2013.01); *H04L 1/0042* (2013.01); *H04L 12/46* (2013.01); *H04L 25/03159* (2013.01); *H04L 2025/03815* (2013.01)

(58) Field of Classification Search
None
See application file for complete search history.

(56) References Cited

U.S. PATENT DOCUMENTS

| 10,355,990 B2* | 7/2019 | Sterenson ............. H04L 12/413 |
| 2014/0273833 A1* | 9/2014 | McCormack ........ H04B 5/0037 455/41.1 |

OTHER PUBLICATIONS

Xuqiang Zheng, "Design of High Speed SerDes Transceiver for Chip-to-Chip Communications in CMOS Process", May 2018, University of Lincoln, p. 1-49 and 98-150. (Year: 2018).*

* cited by examiner

*Primary Examiner* — Alpus Hsu
*Assistant Examiner* — Camquyen Thai
(74) *Attorney, Agent, or Firm* — JCIP Global Inc.

(57) ABSTRACT

This invention discloses a multimode interconnection interface controller for a converged network, which comprises a SERDES element responsible for serial/parallel conversion, a LANE_TXCLK element responsible for generating a transmit clock, a SERDES initialization element responsible for link training and rate negotiation, and a PCS_EB coding element and an PCS_AF coding element responsible for physical layer coding of messages. The link training and rate negotiation are completed automatically via the shared SERDES initialization element. More universality and flexibility are provided for interconnection chip design by the PCS_EB coding element. The PCS_AF coding element is provided to reduce message penetration delay. The multimode interconnection interface controller is integrated in a (Continued)

single chip. Through flexible configuration, the single chip can meet transmission requirements of dedicated high speed networks and Ethernet networks. The multimode interconnection interface controller also supports interconnection of data center Ethernet and high performance computing high speed network.

6 Claims, 6 Drawing Sheets

(51) Int. Cl.
*H04L 12/46* (2006.01)
*H04L 25/03* (2006.01)
*H04L 69/24* (2022.01)

MULTIMODE INTERCONNECTION INTERFACE CONTROLLER FOR CONVERGED NETWORK

CROSS-REFERENCE TO RELATED APPLICATION

This application claims the priority benefit of China application serial no. 202010402731.4, filed on May 13, 2020. The entirety of the above-mentioned patent application is hereby incorporated by reference herein and made a part of this specification.

BACKGROUND

Technical Field

This invention relates to the field of interconnection chips, in particular to a multimode interconnection interface controller for convergence of Ethernet network and dedicated high speed network.

Description of Related Art

Interconnection chips are widely used in data center, high performance computing (HPC) and multi-processor fields. The link rate continues to rise and shows different application characteristics. The data center network continues to develop toward bandwidth higher than 400G. With the gradual popularization of video services and 5G services in the future, the market of 400G Ethernet interconnection chips has begun to take shape. In 2018, Marvell launched a transceiver chip supporting 400G Ethernet, compatible with IEEE802.3cd standard, and meeting the ultrahigh bandwidth requirements of emerging applications such as artificial intelligence and machine learning. In 2018, Broadcom Corporation delivered Tomahawk® 3 series switch chips supporting single chip 32×400G, 64×200G or 128×100G rate switching and routing, signalling imminent arrival of the 400G Ethernet era for data centers. High performance computers generally adopt dedicated high speed interconnection, which pursue high bandwidth while emphasizing low latency and high reliability. At present, TOP 4 high performance computers Summit, TaihuLight, Sierra and Tianhe-2 all adopt 100G interconnection, with hop delay less than 100 ns. Next generation private interconnection aims at 200G rate. In 2018, Mellanox launched HDR (high data rate) switch chip, the port thereof contains 4-channel 50G signal, but bit error rate is reduced by about 6 orders of magnitude. The interconnection interface thereof introduces a delay of about 200 ns, which is difficult to adapt to some HPC applications. Therefore, it is urgent to further reduce the port delay.

The interconnection chips usually involve two chips, namely Ethernet chips centered on data centers and dedicated high speed network chips centered on high performance computers. Such two interconnection chips are typically represented by Broadcom Corporation and Mellanox, face different application requirements and coexisted with each other in the past two decades. However, in recent years, with continuous expansion of data center services, the traditional private network also began to have Ethernet application characteristics to meet cloud computing requirements. Meanwhile, due to gradual popularization of AI applications in future data centers, emphasis is also being placed on low-latency property of Ethernet networks. At present, a convergence trend of the Ethernet network and a private network is taking place gradually in the industry. Mellanox was the first company to focus on high performance private interconnection research and development. In 2016, the high speed private interconnection network card ConnectX was configured with dual network function, which saved system construction cost. At present, there is no dual network converged switch chip. In 2019, Cray Inc. launched Slingshot interconnection chip for exascale computers. The biggest difference between the Slingshot interconnection chip and previous generations is integration of Ethernet function, AND design of simplified HPC interconnection technology based on 400G Ethernet protocol. The Slingshot interconnection chip is characteristic of low latency and high bandwidth, and also meets the application requirements of data centers. In 2019, Ethernet Alliance announced low latency FEC (forward error correction) specification for 50G, 100G and 200G Ethernet based on IB specification. The Low latency FEC enables Ethernet to better meet higher requirements of HPC, machine learning and financial transactions for interconnection performance.

The two interconnection interfaces generally use different circuit structures. The design of Ethernet interconnection interface follows the Ethernet standard, pursues characteristics of high bandwidth and low cost, and can tolerate high latency. The Ethernet interconnection interface uses a physical coding layer design based on elastic buffer, which relaxes constraints between a core switch clock and a SERDES (Serializer/Deserializer) transmit clock, and has better universality. However, the Ethernet interconnection interface needs to insert/delete idle characters when necessary, which results in great latency. In contrast, the dedicated high speed network uses more customized designs, and pursues high bandwidth and low latency. The physical coding layer of the dedicated high speed network works in a SERDES transmit clock domain, and uses asynchronous buffer, which has avoided the great latency caused by the elastic buffer.

In order to realize convergence of dual network (an Ethernet network and a dedicated high speed network) and simultaneously integrate two network interconnection interfaces inside the same chip, it is necessary to solve problems of clock generation, data path and initialization function sharing caused by coexistence of two network interconnection interface controllers.

SUMMARY

A multimode interconnection interface controller for a converged network, comprises a SERDES element responsible for serial/parallel conversion, a LANE_TXCLK element (LANE for Transmit Clock) responsible for generating a transmit clock, a SERDES initialization element responsible for link training and rate negotiation, and a PCS_EB (Physical Coding Sublayer Elastic Buffer) coding element and a PCS_AF (Physical Coding Sublayer Asynchronous Buffer) coding element responsible for physical layer coding of messages. For any port, only one of the PCS_EB coding element and the PCS_AF coding element works at any time.

As an entry of the multimode interconnection interface controller for the converged network, the SERDES element externally connects a reference clock refclk, mn input links rx[1:mn] and mn output links tx[1:mn] (m and n are positive integers), and internally connects the LANE_TXCLK element, the SERDES initialization element, the PCS_EB coding element and the PCS_AF coding element, and the SERDES element is responsible for serial/parallel and parallel/serial conversion of data received and sent by m ports, where rx[1:mn] is a simplified representation of mn arrays rx[1], . . . , rx[mn], tx[1:mn] is a simplified representation of mn arrays tx[1], . . . , tx[mn], and array abbreviation [1:mn] is a simplified representation of 1 to mn. The SERDES element receives the reference clock refclk from an external crystal oscillator, generates a high frequency (HF) transmit clock htxclk and an intermediate frequency (IF) transmit clock ltxclk, and sends the clocks to the LANE_TXCLK element. The SERDES element receives valid data txdata[1: mn] of the mn links from the SERDES initialization element, receives mn transmit clocks txclk[1:mn] from the LANE_TXCLK element, samples the txdata[i] by means of the txclk[i], completes the parallel/serial conversion and generates transmit serial data tx[i], and outputs the transmit serial data tx[i], i is a positive integer, and i≤mn. The SERDES element receives the serial data from the mn input links rx[1:mn], performs serial/parallel conversion recovery to generate receive data rxdata[1:mn] and recovery clocks rxclk[1:mn], and sends the receive data rxdata[1:mn] and the recovery clocks rxclk[1:mn] to the SERDES initialization element, the PCS_EB coding element and the PCS_AF coding element.

The LANE_TXCLK element is connected with the SERDES initialization element, the PCS_EB coding element, the PCS_AF coding element and the SERDES element, and is responsible for generating the transmit clocks txclk[1:mn] on the mn links in n ports. The LANE_TXCLK element receives the HF transmit clock htxclk and the IF transmit block ltxclk from the SERDES element, receives rate configuration register values Rmode[1:n] from the SERDES initialization elements, receives mode configuration register values Pmode[1:n] from a global register, generates the transmit clocks txclk[1:mn] on the mn links, and sends the transmit clocks txclk[1:mn] to the SERDES initialization element, the PCS_EB coding element, the PCS_AF coding element and the SERDES element.

The SERDES initialization element is connected with the SERDES element, the PCS_EB coding element, the PCS_AF coding element and the LANE_TXCLK element, and responsible for equalization parameter training and rate negotiation of the output links in n ports, generates the valid data txdata[1:mn] of the mn output links according to the configuration register values Pmode[1:n] and sends the data to the SERDES element, thus realizing initialization function and data path sharing. The SERDES initialization element receives the mode configuration register values Pmode[1:n] from the global register, generates the rate configuration register values Rmode[1:n], and sends the values to the SERDES initialization element. The SERDES initialization element receives the data rxdata[1] and the recovery clocks rxclk[1:mn] from the SERDES element to perform parameter training and rate negotiation, receives the transmit clocks txclk[1:mn] from the LANE_TXCLK element, receives the valid data txdata_eb[1:nm] from the PCS_EB coding element, receives the valid data txdata_af [1:mn] from the PCS_AF coding element, generates the valid data txdata[1:mn] and sends the data to the SERDES element.

The PCS_EB coding element is connected with the LANE_TXCLK element, the SERDES element and SERDES initialization element, and is responsible for encoding the valid data rxdata[1:mn] of the mn links in the n ports. The PCS_EB coding element receives the txclk[1:mn] from the LANE_TXCLK element, receives a core clock coreclk from the outside, receives the recovery clocks rxclk[1:mn] from the SERDES element, and uses elastic buffer to complete clock domain crossing data transmission between the core clock coreclk and the SERDES transmit/receive clock txclk/rxclk. The PCS_EB coding element receive message data ltdata[1:n] of the n ports from the link layer, and sends the txdata_eb[1: mn] to the SERDES initialization element after encoding by the physical layer. The PCS_EB coding element receives the data rxdata[1:mn] and the recovery clocks rxclk[1:mn] from the SERDES element, and sends the lrdata[1:n] message data to the link layer after decoding by the physical layer.

The PCS_AF coding element is connected with the LANE_TXCLK element, the SERDES element and the SERDES initialization element, and is responsible for encoding the valid data rxdata[1:mn] of the mn links in the n ports. The PCS_AF coding element requires core frequency coreclk to be not less than txclk/rxclk frequency, and requires the transmit clocks of the m links in the same port to have identical phase. The PCS_AF coding element receives the txclk[1:mn] from the LANE_TXCLK element, receives the core clock coreclk from the outside, receives the recovery clocks rxclk[1:mn] from the SERDES element, and uses asynchronous buffer to complete the clock domain crossing data transmission between the core clock coreclk and the SERDES transmit/receive clock txclk/rxclk. The PCS_AF coding element receives the message data ltdata[1:n] of the n ports from the link layer, and sends the txdata_af[1:mn] to the SERDES initialization element after encoding by the physical layer. The PCS_AF coding element receives the data rxdata[1:mn] and the recovery clocks rxclk[1:mn] from the SERDES element, and sends the lrdata[1:n] message data to the link layer after decoding by the physical layer.

Further, SERDES initialization element comprises n port initialization units, n mode multiplexer units DMUX1 to DMUXn, and n initialization multiplexer units IMUX1 to IMUXn.

A jth port initialization unit is connected with the LANE_TXCLK element, the SERDES element and a multiplexer unit IMUXj, receives m transmit clocks txclk[(j−1)m+1: (j−1)m+m] from the LANE_TXCLK element, sends training test frame data txdata_i[(j−1)m+1: (j−1)m+m] to the initialization multiplexer unit IMUXj after processing by the port, and sends a rate configuration register value Rmode[j] to the LANE_TXCLK element, j is an integer, and 1≤j≤n; and receives data rxdata[(j−1)m+1:(j−1)m+m] and recovery clocks rxclk[(j−1)m+1: (j−1)m+m] from the SERDES element, and sends an initialization signal init[j] to the initialization multiplexer unit IMUXj after receiving the training test frame check.

A jth mode multiplexer unit DMUXj is connected with the PCS_EB coding element, the PCS_AF coding element and a jth mode initialization multiplexer unit IMUXj, receives valid data signals txdata_eb[(j−1)m+1:(j−1)m+m] from the PCS_EB coding element, receives valid data signals txdata_ef[(j−1)m+1: (j−1)m+m] from the PCS_AF coding element, and generates and sends temporary data to the IMUXj according to selection of a port configuration register Pmode [j].

The j jth mode initialization multiplexer unit IMUXj is connected with the jth mode multiplexer unit DMUXj, the jth port initialization unit and the SERDES element, receives the temporary data from the DMUXj unit, receives the training test frame data txdata_i[j−1)m+1: (j−1)m+m] and init[j] from the jth port initialization unit, generates valid data signals txdata[(j−1)m+1: (j−1)m+m] according to selection of a init[j] value, and sends the signals to the SERDES element.

Further, the port initialization unit j takes the following steps to complete equalization parameter training and port rate negotiation of the output links in the jth port:

step 1): enter an initial state after power-on reset, or proceed to step 2) for parameter training and rate negotiation if a software start training command is received or the rxdata[(j−1)m+1: (j−1)m+m] received from the SERDES element are training test frames;

step 2): take a minimum rate rate[0] to exchange negotiation parameters, with the rate at least comprising w transmission rates supported by the j port, and w being a natural number; record the w transmission rates rate[f] supported by the j port, with 1≤f≤w and f being a natural number, rank the rate[f] in a rate decreasing order, that is, if u≤v, the rate[u]≥rate[v], with rate[0] being the minimum rate supported by the j port; and set f=1 after exchanging the parameters, and proceed to step 3);

step 3): set a rate configuration register Rmode[j] according to the rate rate[f], and send to the LANE_TXCLK element; and then initialize equalization parameters and proceeding to step 4);

step 4): send the training test frames according to the valid data signals txdata_i[(j−1)m+1: (j−1)m+m], and receive the training test frames from the rxdata[(j−1)m+1: (j−1)m+m]; and determine the negotiation rate rate[f] and transmit end equalization parameters if the received training test frames pass the check, and end the whole process; or proceed to step 5) if the training test frames fail to pass the check;

step 5: adjust the transmitting equalization parameters; try a next equalization parameter for successful adjustment, and go back to the step 4), otherwise all the equalization parameters used by the rate rate[f] are invalid, and proceed to step 6); and step 6): try a next rate to continue negotiation, with f=f+1; if f>w, only the minimum rate rate[0] succeeds, determine the negotiation rate rate[0], and end the whole process; or try next rate and proceed to the step 3).

Further, the LANE_TXCLK element consists of mn Txclk rate adjustment units and n Txclk mode adjustment units, and every m Txclkrate adjustment units correspond to a Txclk mode adjustment unit. A kth (1(k≤mn) Txclk rate adjustment unit generates a temporary transmit clock txclk_t [k] of a link k according to the rate configuration register value Rmode[1:n] from the SERDES initialization element. The kth Txclk rate adjustment unit is connected with the SERDES element and an lth Txclk mode adjustment unit (l=[k/m]), and consists of 6 frequency dividing units DIV_p1 to DIV_p6 and 7 clock multiplexer units RMux1 to RMux7. The frequency dividing units DIV_p1, DIV_p2 and DIV_p3 respectively receive a high frequency (HF) clock htxclk from the SERDES element, generate frequency dividing clocks after frequency dividing by p1, p2 and p3, and respectively send to an OSC0 end of the RMux1 unit, and OSC1 ends of the RMux1 unit and the RMux3 unit, p1, p2 and p3 are integers greater than 2, the OSC0 and OSC1 are crystal oscillator and oscillator pins. The frequency dividing units DIV_p4, DIV_p5 and DIV_p6 respectively receive an intermediate frequency (IF) clock ltxclk from the SERDES element, generate frequency dividing clocks after frequency dividing by p4, p5 and p6, and send to an OSC0 end of the RMux2 unit, and OSC1 ends of the RMux2 unit and the RMux4 unit, and p4, p5 and p6 are integers greater than 2. The RMux1 unit receives p1 frequency dividing clock and p2 frequency dividing clock from the DIV_p1, generates Txclk temporary clock 1 according to selection of a Rmode [l] value, and sends to the OSC0 end of the RMux3 unit. The RMux3 unit receives the Txclk temporary clock 1 and p3 frequency dividing clock from the DIV_p3, generates Txclk temporary clock 2 according to selection of the Rmode[l] value, and sends to the OSC0 end of the RMux5 unit. The RMux5 unit receives the Txclk temporary clock 2 and the htxclk clock from the SERDES element, generates a temporary clock 3 according to selection of the Rmode[l] value, and sends to the OSC0 end of the RMux7 unit. The RMux2 unit, the RMux4 unit and the RMux6 unit generate a temporary clock 6 according to selection of the Rmode[l] value, and send to the OSC1 end of the RMux7 unit. At last, the RMux7 unit generates a temporary transmit clock txclk_t [k] of the ith link according to selection of the Rmode[l] value and sends to the lth Txclk mode adjustment unit. The Txclk rate adjustment unit can generate 8 temporary transmit clock frequencies htxclk, htxclk/p1, htxclk/p2, htxclk/p3 and ltxclk, ltxclk/p4, ltxclk/p5 and ltxclk/p6 according to specific value Rmode[l] of the rate configuration register.

The lth Txclk mode adjustment unit generates in transmit clocks txclk[(l−1)m+1: (l−1)m+m] in the port l according to the mode configuration register value Pmode[l], and sends to the LANE_TXCLK element, the SERDES initialization element, the PCS_EB coding element and the PCS_AF coding element. The PCS_EB coding element allows different phases for the transmit clocks of the m links in the same port, while the PCS_AF coding element requires the same phase for the transmit clocks of the m links in the same port, therefore, the Txclk mode adjustment unit generates different transmit clocks for the two requirements respectively. The lth Txclk mode adjustment unit consists of m−1 clock multiplexer units PMux2 to PMuxm. The lth Txclk mode adjustment unit receives the temporary transmit clocks from the (l−1)m+1 to (l−1) m+m TXCLK rate adjustment unit, which is recorded as txclk_t[(l−1)m+(l−1)m+m]. Pmode[l]=1 means Ethernet mode, and the PMux2 to PMuxm units select txclk_t[(l−1)m+1: (l−1)m+m] as the m transmit clocks txclk[(l−1)m+1: (l−1)m+m] of the l port. Pmode[l]=0 means the dedicated high speed network mode, and the PMux2 to PMuxm units select txclk_t[(l−1)m+1] to copy m copies as the m transmit clocks txclk[(l−1)m+1: (l−1)m+m] of the l port. To this end, the Txclk mode adjustment unit selects whether the in transmit clocks in the same port are in-phase clocks according to selection of the Pmode[l]. Further, the PCS_EB coding element consists of n EPD (Ethernet Port Data) modules and n EPCS (Ethernet Physical Coding Sublayer) modules. A jth EPD module is recorded as EPD_j module, and is responsible for data width adaptation and valid data monitoring of the port j. The EPD_j module is connected with the LANE_TXCLK element, the SERDES element, the SERDES initialization element and a jth EPCS module (recorded as EPCS_j module). The EPD_j module comprises m elastic buffers TF_1, . . . , TF_r, . . . , TF_m, in gearboxes TG_1, . . . , TG_r, . . . , TG_m, m elastic buffers RF_1, . . . , RF_r, . . . , RF_m, in sync locks RL_1, . . . , RL_r, . . . , RL_m, and m gearboxes RG_1, . . . , RG_r, . . . , RG_m, 1≤r≤m, and r is a natural number. In a sending direction, the EPD_j module receives transmit clocks txclk[(l−1)m+1: (j−1)m+m] from the LANE_TXCLK element, and sends the clocks txclk[j*m+r] to the gearbox TG_r and the elastic buffer TF_r. A write port of the elastic buffer TF_r works in the core clock domain coreclk, and receives m data of the j port from the EPCS_j module. The TF_r dynamically inserts/deletes idle characters when necessary. A read port of the elastic buffer TF_r works in the txclk[(j−1)m+r], reads out data and sends to the gearbox TG_r. The gearbox TG_r of the EPD_j module receives data from the elastic buffer TF_r, and sends data txdata_eb [(j−1)m+r] to the SERDES initialization element after width conversion. In a receiving direction, the EPD_j module receives data rxdata[(j−1)m+1: (j−1)m+m] on the port j and recovery clocks rxclk[j−1)m+1:

(j−1)m+m] from the SERDES element, send rxclk[(l−1)m+r] to the gearbox RG_r, a lock unit RL_r and the elastic buffer RF_r. The gearbox RG_r receives data rxdata[(j−1)m+r] from the SERDES element, and sends the data to the lock unit RL_r after width conversion. The lock unit RL_r determines that the link is locked, and then sends the data to the elastic buffer RF_r. An write port of the elastic buffer RF_r works in the rxclk[(j−1)m+r] clock domain. The elastic buffer RF_r dynamically inserts/deletes idle characters as applicable. A read port of the elastic buffer RF_r works in the core clock domain coreclk, reads out valid data and sends to the EPCS_j module.

The EPCS_j module is connected with the EPD_j module, and works in the core clock domain coreclk. The EPCS_j module receives input message ltdata[j] of the link layer for 66B/64B coding or FEC coding, and then sends m valid data of the port j to the TF_1 to TF_m of the EPD_j module. The EPCS_j module receives m valid data from the RF_1 to RF_m in the EPD_j module for 66B/64B decoding or FEC decoding, and then outputs message lrdata[j] to the link layer. Further, the PCS_AF coding element consists of n HPD (Highspeed Port Data) modules, n HPCS (Highspeed Physical Coding Sublayer) modules, n transmit asynchronous buffers TAF and n receive asynchronous buffers RAF. A jth HPD module is recorded as HPD_j module, and is connected with the LANE_TXCLK element, a jth HPCS module (recorded as HPCS_j module), the SERDES initialization element and the SERDES element. The HPD_j module comprises m gearboxes TG_1, . . . , TG_r, . . . , TG_m, in sync locks RL_1, . . . , RL_r, . . . , RL_m, and m gearboxes RG_1, . . . , RG_r, . . . , RG_m, 1≤r≤m, and r is a natural number. The HPD_j module receives transmit clocks txclk[(j−1)m+1: (j−1)m+m] from the LANE_TXCLK element, sends transmit clocks txclk[(j−1)m+1] to the HPCS_j module, and transmit clocks txclk[(j−1)m+r] to m gearboxes TG_r, r=1, . . . , m. At that time, input Rmode[j] of the LANE_TXCLK element equals 1, therefore, the txclk [(j−1)m+r] and txclk [(j−1)m+1] are identical clocks for any r (1 because r≤m). The gearbox TG_r receives data from the HPCS module, and sends data txdata_af[(j−1)m+r] to the SERDES initialization element after width conversion. The HPD_j module receives data rxdataR[(j−1)m+1: (j−1)m+m] and recovery clocks rxclk[(j−1)m+1: (j−1)m+m] from the SERDES element, and sends rxclk[(j−1)m+r] to the gearbox RG_r and the lock unit RL_r. The gearbox RG_r receives data rxdata[(j−1)m+r] from the SERDES element, and sends the data to the lock unit RL_r after width conversion. The lock unit RL_r determines that the link is locked, and then sends the data to a jth HPCS_j module.

The HPCS_j module works in txclk[(j−1)m+1] clock domain, and is connected with the HPD_j module, the asynchronous buffer TAF_j and the asynchronous buffer RAF_j. The HPCS_j module reads messages from the asynchronous buffer TAF_j for 66B/64B coding or FEC coding, and sends coding data to the gearboxes TG_1 to TG_m of the HPD_j module; and receives link lock valid data from the sync locks RL_1 to RL_m of the HPD_j module for 66B/64B decoding or FEC decoding, and then writes in the asynchronous buffer RAF_j.

A write port of the asynchronous buffer TAF_j works in the core clock domain coreclk, and is connected with the link layer and the HPCS_j module. The asynchronous buffer TAF_j receives message data ltdata[j] from the link layer for caching. A read port of the asynchronous buffer TAF_j works in the txclk[(j−1)m+1] clock domain, reads the message data ltdata[j] and sends to the HPCS_j module for coding.

A write port of the asynchronous buffer RAF_j works in the txclk[(j−1)m+1] clock domain, and is connected with the link layer and the HPCS_j module. It receives message data from the HPCS_j module. A read port of the asynchronous buffer RAF_j works in the core clock domain coreclk, and sends the message data to an upper link layer as long as the buffer is non-null.

DESCRIPTION OF THE EMBODIMENTS

Figure 1:
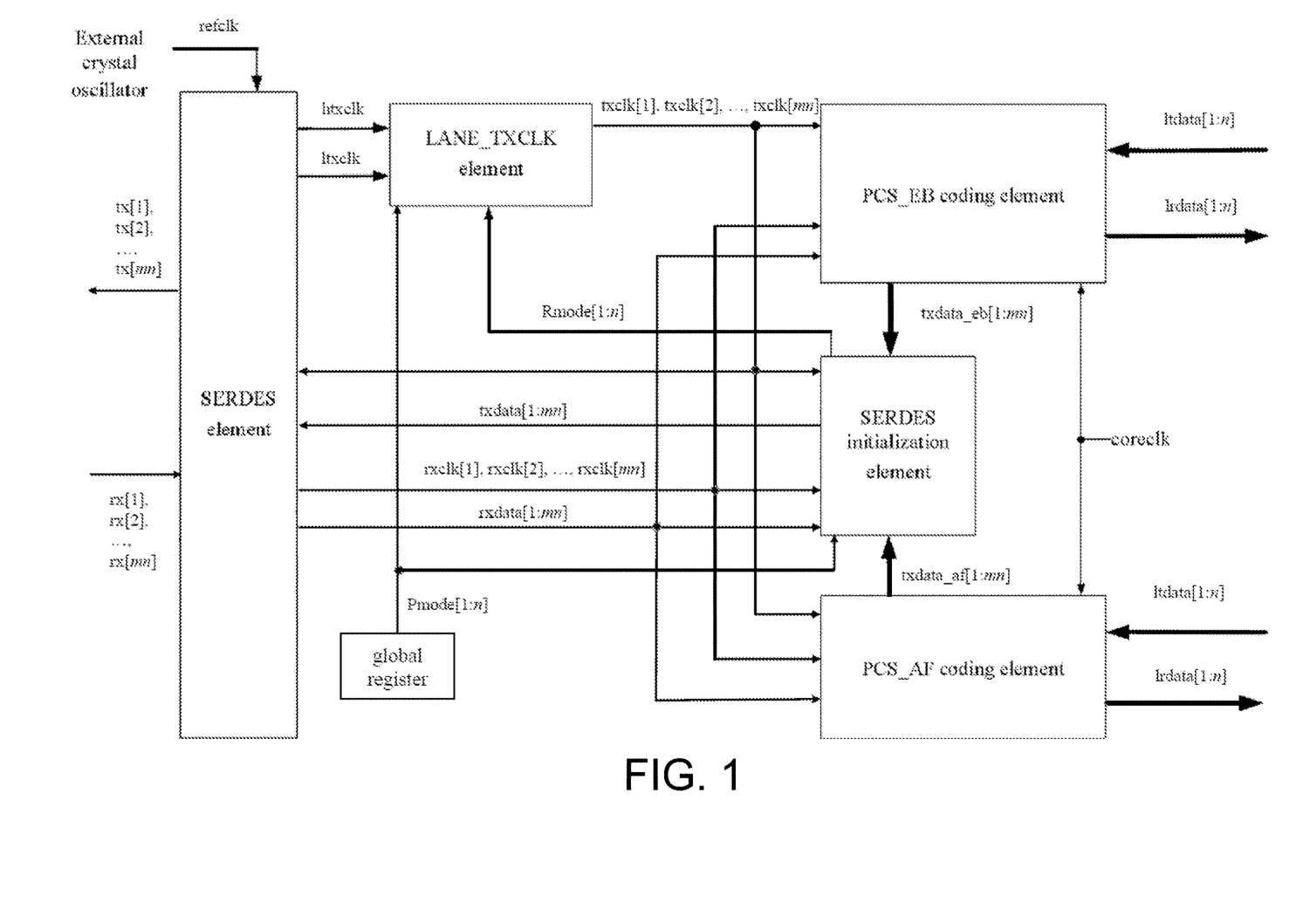
FIG. 1 shows an overall structure of a multimode interconnection interface controller for a converged network in an application of this invention.

As shown in FIG. 1, an overall structure of the multimode interconnection interface controller for a converged network in the application comprises a SERDES element responsible for serial/parallel conversion, a LANE_TXCLK element responsible for generating a transmit clock, a SERDES initialization element responsible for link training and rate negotiation, and a PCS_EB coding element and an PCS_AF coding element responsible for physical layer coding of messages.

As an entry of the multimode interconnection interface controller for the converged network, the SERDES element externally connects a reference clock refclk, mn input links rx[1:mn] and mn output links tx[1:mn] (m and n are positive integers), and internally connects the LANE_TXCLK element, the SERDES initialization element, the PCS_EB coding element and the PCS_AF coding element, and the SERDES element is responsible for serial/parallel and parallel/serial conversion of data received and sent by m ports. Here, rx[1:mn] is a simplified representation of mn arrays rx[1] . . . rx[mn], tx[1:mn] is a simplified representation of mn arrays tx[1] . . . tx[mn], and array abbreviation [1:mn] is a simplified representation of 1 to mn. The SERDES element receives the reference clock refclk from an external crystal oscillator, generates a high frequency (HF) transmit clock htxclk and an intermediate frequency (IF) transmit clock ltxclk, and sends the clocks to the LANE_TXCLK element. The SERDES element receives valid data txdata[1:mn] of the mn links from the SERDES initialization element, receives mn transmit clocks txclk[1:mn] from the LANE_TXCLK element, samples the txdata[i] by means of the txclk[i], completes the parallel/serial conversion and generates transmit serial data tx[i], and outputs the transmit serial data tx[i], i is a positive integer, and i≤mn. The SERDES element receives the serial data from the mn input links rx[1:mn], performs serial/parallel conversion recovery to generate receive data rxdata[1:mn] and recovery clocks rxclk[1:mn], and sends the receive data rxdata[1:mn] and the recovery clocks rxclk[1:mn] to the SERDES initialization element, the PCS_EB coding element and the PCS_AF coding element.

The LANE_TXCLK element is connected with the SERDES initialization element, the PCS_EB coding element, the PCS_AF coding element and the SERDES element, and is responsible for generating the transmit clocks txclk[1:mn] on the mn links in n ports. The LANE_TXCLK element receives the HF transmit clock htxclk and the IF transmit block ltxclk from the SERDES element, receives rate configuration register values Rmode[1:n] from the SERDES initialization elements, receives mode configuration register values Pmode[1:n] from a global register, generates the transmit clocks txclk[1:mn] on the mn links, and sends the transmit clocks txclk[1:mn] to the SERDES initialization element, the PCS_EB coding element, the PCS_AF coding element and the SERDES element.

The SERDES initialization element is connected with the SERDES element, the PCS_EB coding element, the PCS_AF coding element and the LANE_TXCLK element, and responsible for equalization parameter training and rate negotiation of the output links in n ports, generates the valid data txdata[1:mn] of the mn output links according to the configuration register values Pmode[1:n] and sends the data to the SERDES element, thus realizing initialization function and data path sharing. The SERDES initialization element receives the mode configuration register values Pmode[1:n] from the global register, generates the rate configuration register values Rmode[1:n], and sends the values to the SERDES initialization element. The SERDES initialization element receives the data rxdata[1:mn] and the recovery clocks rxclk[1:mn] from the SERDES element to perform parameter training and rate negotiation, receives the transmit clocks txclk[1:mn] from the LANE_TXCLK element, receives the valid data txdata_eb[1:mn] from the PCS_EB coding element, receives the valid data txdata_af [1:mn] from the PCS_AF coding element, generates the valid data txdata[1:mn] and sends the data to the SERDES element.

The PCS_EB coding element is connected with the LANE_TXCLK element, the SERDES element and SERDES initialization element, and is responsible for encoding the valid data rxdata[1:mn] of the mn links in the n ports. The PCS_EB coding element receives the txclk[1:mn] from the LANE_TXCLK element, receives a core clock coreclk from the outside, receives the recovery clocks rxclk[1:mn] from the SERDES element, and uses elastic buffer to complete clock domain crossing data transmission between the core clock coreclk and the SERDES transmit/receive clock txclk/rxclk. The PCS_EB coding element receive message data ltdata[1:n] of the n ports from the link layer, and sends the txdata_eb[1: mn] to the SERDES initialization element after encoding by the physical layer. The PCS_EB coding element receives the dataa rxdata[1:mn] and the recovery clocks rxclk[1:mn] from the SERDES element, and sends the lrdata[1:n] message data to the link layer after decoding by the physical layer.

The PCS_AF coding element is connected with the LANE_TXCLK element, the SERDES element and the SERDES initialization element, and is responsible for encoding the valid data rxdata[1:mn] of the mn links in the n ports. The PCS_AF coding element requires core frequency coreclk to be not less than txclk/rxclk frequency, and requires the transmit clocks of the m links in the same port to have identical phase. The PCS_AF coding element receives the txclk[1:mn] from the LANE_TXCLK element, receives the core clock coreclk from the outside, receives the recovery clocks rxclk[1:mn] from the SERDES element, and uses asynchronous buffer to complete the clock domain crossing data transmission between the core clock coreclk and the SERDES transmit/receive clock txclk/rxclk. The PCS_AF coding element receives the message data ltdata[1:n] of the n ports from the link layer, and sends the txdata_af[1:mn] to the SERDES initialization element after encoding by the physical layer. The PCS_AF coding element receives the data rxdata[1:mn] and the recovery clocks rxclk[1:mn] from the SERDES element, and sends the lrdata[1:n] message data to the link layer after decoding by the physical layer.

Figure 2:
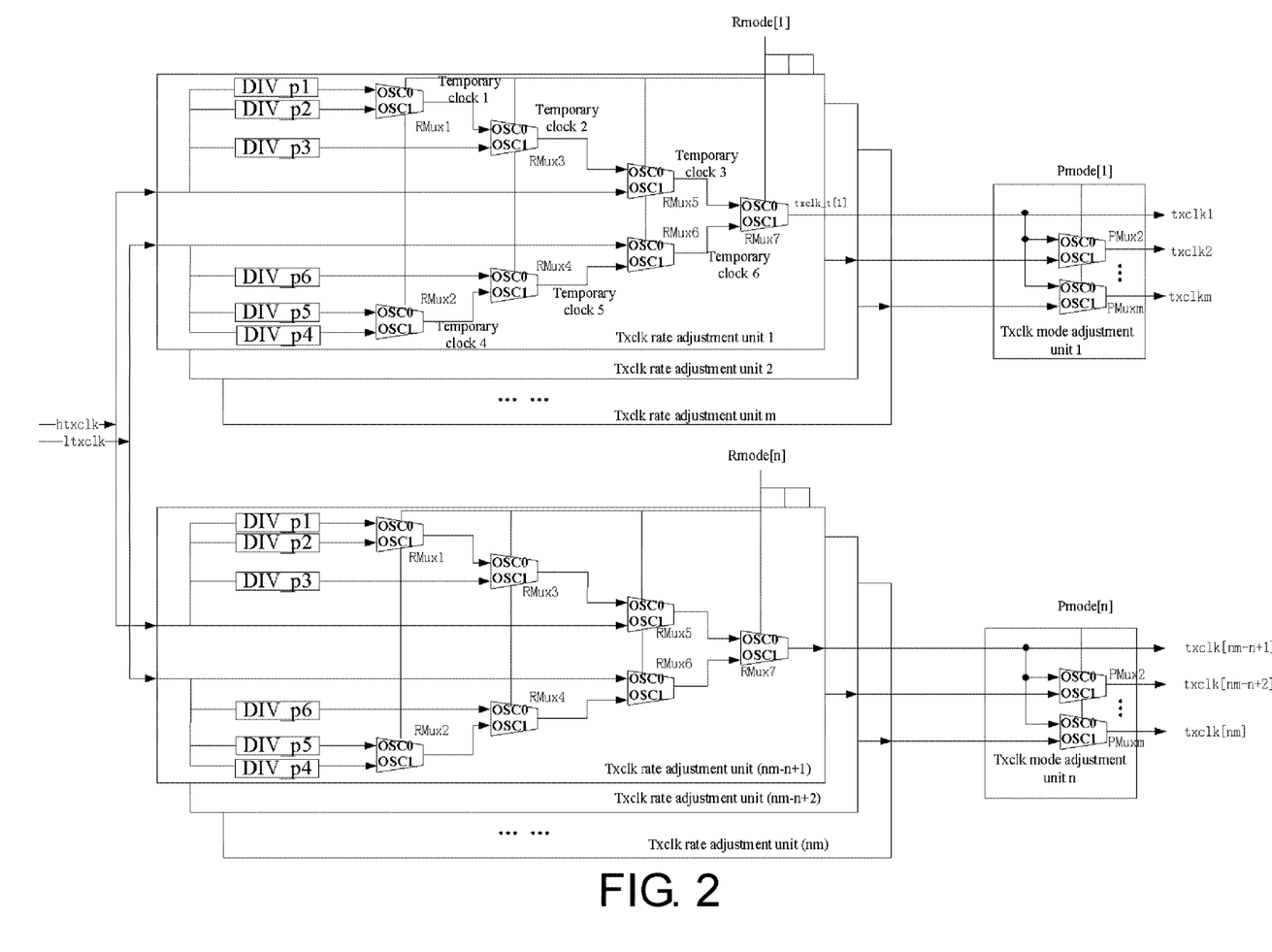
FIG. 2 is a structural diagram of generating a transmit clock of a LANE_TXCLK element in an application of this invention.

FIG. 2 is a structural diagram of generating a transmit clock of a LANE_TXCLK element in an application of this invention. The LANE_TXCLK element generates transmit clocks txclk[1:mn] of mn links according to a rate configuration register value Rmode[1:n] and mode configuration register value Pmode[1:n]. The LANE_TXCLK element consists of mn TXCLK rate adjustment units and n TXCLK mode adjustment units, and every m Txclk mode adjustment units correspond to a Txclk mode adjustment unit.

The LANE_TXCLK element consists of mn Txclk rate adjustment units and n Txclk mode adjustment units. A kth (1 ≤k≤mn) Txclk rate adjustment unit generates a temporary transmit clock txclk_t[k] of a link k according to the rate configuration register value Rmode[1:n] from the SERDES initialization element. The kth Txclk rate adjustment unit is connected with the SERDES element and a lth Txclk mode adjustment unit (l=[k/m]), and consists of 6 frequency dividing units DIV_p1 to DIV_p6 and 7 clock multiplexer units RMux1 to RMux7. The frequency dividing units DIV_p1, DIV_p2 and DIV_p3 respectively receive a high frequency (HF) clock htxclk from the SERDES element, generate frequency dividing clocks after frequency dividing by p1, p2 and p3, and respectively send to an OSC0 end of the RMux1 unit, and OSC1 ends of the RMux1 unit and the RMux3 unit, p1, p2 and p3 are integers greater than 2, the OSC0 and OSC1 are crystal oscillator and oscillator pins. The frequency dividing units DIV_p4, DIV_p5 and DIV_p6 respectively receive an intermediate frequency (IF) clock ltxclk from the SERDES element, generate frequency dividing clocks after frequency dividing by p4, p5 and p6, and send to an OSC0 end of the RMux2 unit, and OSC1 ends of the RMux2 unit and the RMux4 unit, and p4, p5 and p6 are integers greater than 2. The RMux1 unit receives p1 frequency dividing clock and p2 frequency dividing clock from the DIV_p1, generates Txclk temporary clock 1 according to selection of a Rmode[l] value, and sends to the OSC0 end of the RMux3 unit. The RMux3 unit receives the Txclk temporary clock 1 and p3 frequency dividing clock from the DIV_p3, generates Txclk temporary clock 2 according to selection of the Rmode[l] value, and sends to the OSC0 end of the RMux5 unit. The RMux5 unit receives the Txclk temporary clock 2 and the htxclk clock from the SERDES element, generates a temporary clock 3 according to selection of the Rmode[l] value, and sends to the OSC0 end of the RMux7 unit. The RMux2 unit, the RMux4 unit and the RMux6 unit generate a temporary clock 6 according to selection of the Rmode[l] value, and send to the OSC1 end of the RMux7 unit. At last, the RMux7 unit generates a temporary transmit clock txclk_t[k] of the ith link according to selection of the Rmode[l] value and sends to the lth Txclk mode adjustment unit. The Txclk rate adjustment unit can generate 8 temporary transmit clock frequencies including htxclk, htxclk/p1, htxclk/p2, htxclk/p3 and ltxclk, ltxclk/p4, ltxclk/p5 and ltxclk/p6 according to specific value Rmode[l] of the rate configuration register.

The lth Txclk mode adjustment unit generates m transmit clocks txclk[(l−1)m+1: (l−1)m+m] in the port l according to the mode configuration register value Pmode[l], and sends to the LANE_TXCLK element, the SERDES initialization element, the PCS_EB coding element and the PCS_AF coding element. The PCS_EB coding element allows different phases for the transmit clocks of m links in the same port, while the PCS_AF coding element requires the same phase for the transmit clocks of the m links in the same port, therefore, the Txclk mode adjustment unit generates different transmit clocks for the two requirements respectively. The lth Txclk mode adjustment unit consists of m−1 clock multiplexer units PMux2 to PMuxm. The lth Txclk mode adjustment unit receives the temporary transmit clocks from the (l−1)m+1 to (l−1) m+m TXCLK rate adjustment unit, recorded as txclk_t[(l−1)m+1: (l−1)m+m]. Pmode[l]=1 means Ethernet mode, and the PMux2 to PMuxm units select txclk_t[(l−1)m+1: (l−1)m+m] as the m transmit clocks txclk[(l−1)m+1: (l−1)m+m] of the l port. Pmode[l]=0 means the dedicated high speed network mode, and the PMux2 to PMuxm units select txclk_t[(l−1)m+1] to copy m copies as the m transmit clocks txclk[(l−1)m+1: (l−1)m+m] of the l port. To this end, the Txclk mode adjustment unit selects whether the m transmit clocks in the same port are in-phase clocks according to selection of the Pmode[l].

Figure 3:
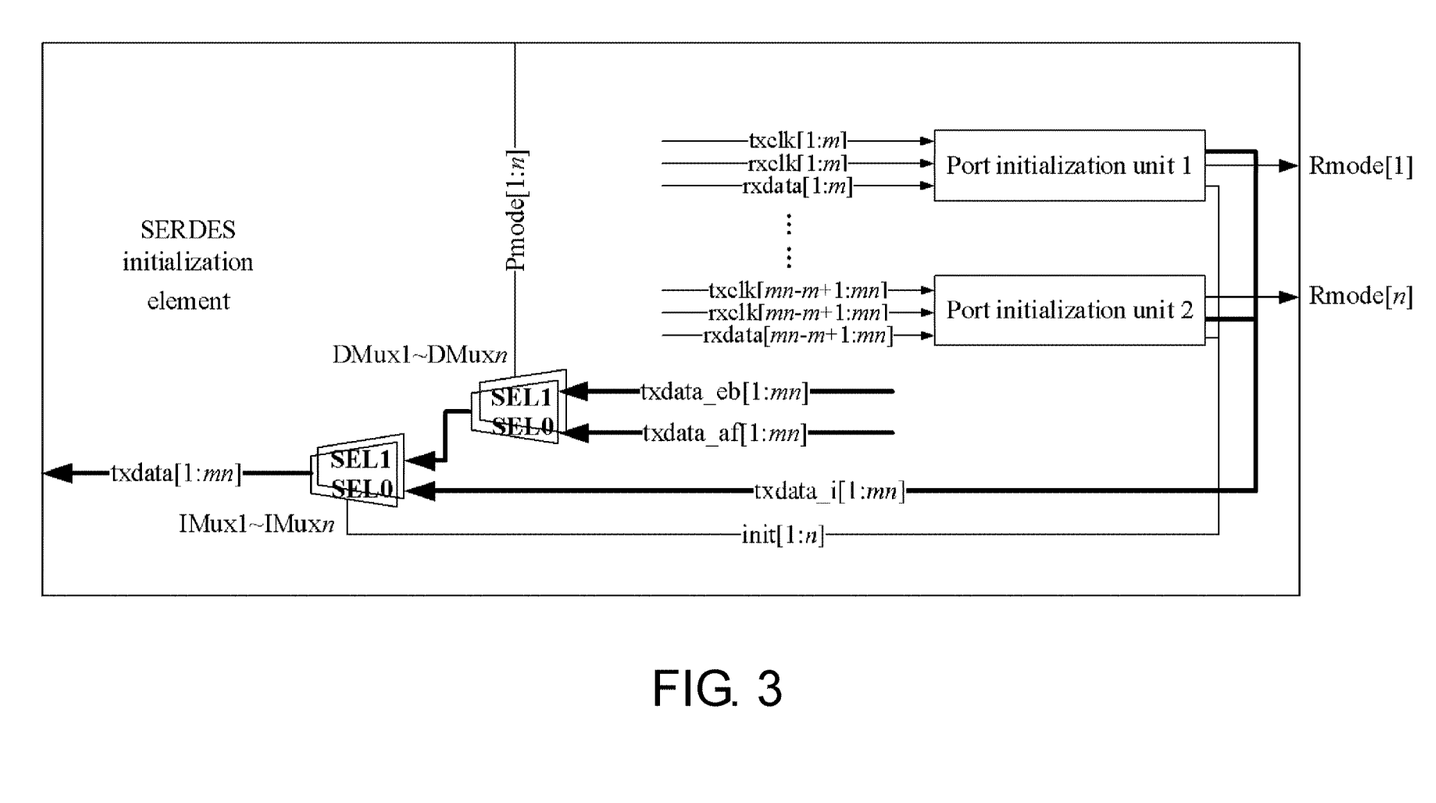
FIG. 3 is a structural diagram of an SERDES initialization element in an application of this invention.

FIG. 3 is a structural diagram of an SERDES initialization element in an application of this invention. For any port j, whether the PCS_EB coding element or the PCS_AF coding element is used, the SERDES initialization element is responsible for equalization parameter training and link rate negotiation. The SERDES initialization element is connected with the PCS_EB coding element, the PCS_AF coding element, the LANE_TXCLK element and the SERDES element, and the SERDES initialization element comprises n port initialization units, n mode multiplexer units DMUX1 to DMUXn, and n initialization multiplexer units IMUX1 to IMUXn.

A jth port initialization unit is connected with the LANE_TXCLK element, the SERDES element and a multiplexer unit IMUXj, receives m transmit clocks txclk[(j−1)m+1: (j−1)m+m] from the LANE_TXCLK element, sends training test frame data txdata_i[(j−1)m+1: (j−1)m+m] to the initialization multiplexer unit IMUXj after processing by the port, and sends a rate configuration register value Rmode[j] to the LANE_TXCLK element, j is an integer, and 1≤j≤n; and receives data rxdata[(j−1)m+1:(j−1)m+m] and recovery clocks rxclk[(j−1)m+1: (j−1)m+m] from the SERDES element, and sends an initialization signal init[j] to the initialization multiplexer unit IMUXj after receiving the training test frame check.

A jth mode multiplexer unit DMUXj is connected with the PCS_EB coding element, the PCS_AF coding element and a jth mode initialization multiplexer unit IMUXj, receives valid data signals txdata_eb[(j−1)m+1:(j−1)m+m] from the PCS_EB coding element, receives valid data signals txdata_ef[(j−1)m+1: (j−1)m+m] from the PCS_AF coding element, and generates and sends temporary data to the IMUXj according to selection of a port configuration register Pmode [j].

The j jth mode initialization multiplexer unit IMUXj is connected with the jth mode multiplexer unit DMUXj, the jth port initialization unit and the SERDES element, receives the temporary data from the DMUXj unit, receives the training test frame data txdata_i[(j−1)m+1: (j−1)m+m] and init[j] from the jth port initialization unit, generates valid data signals txdata[(j−1)m+1: (j−1)m+m] according to selection of a init[j] value, and sends the signals to the SERDES element.

Figure 4:
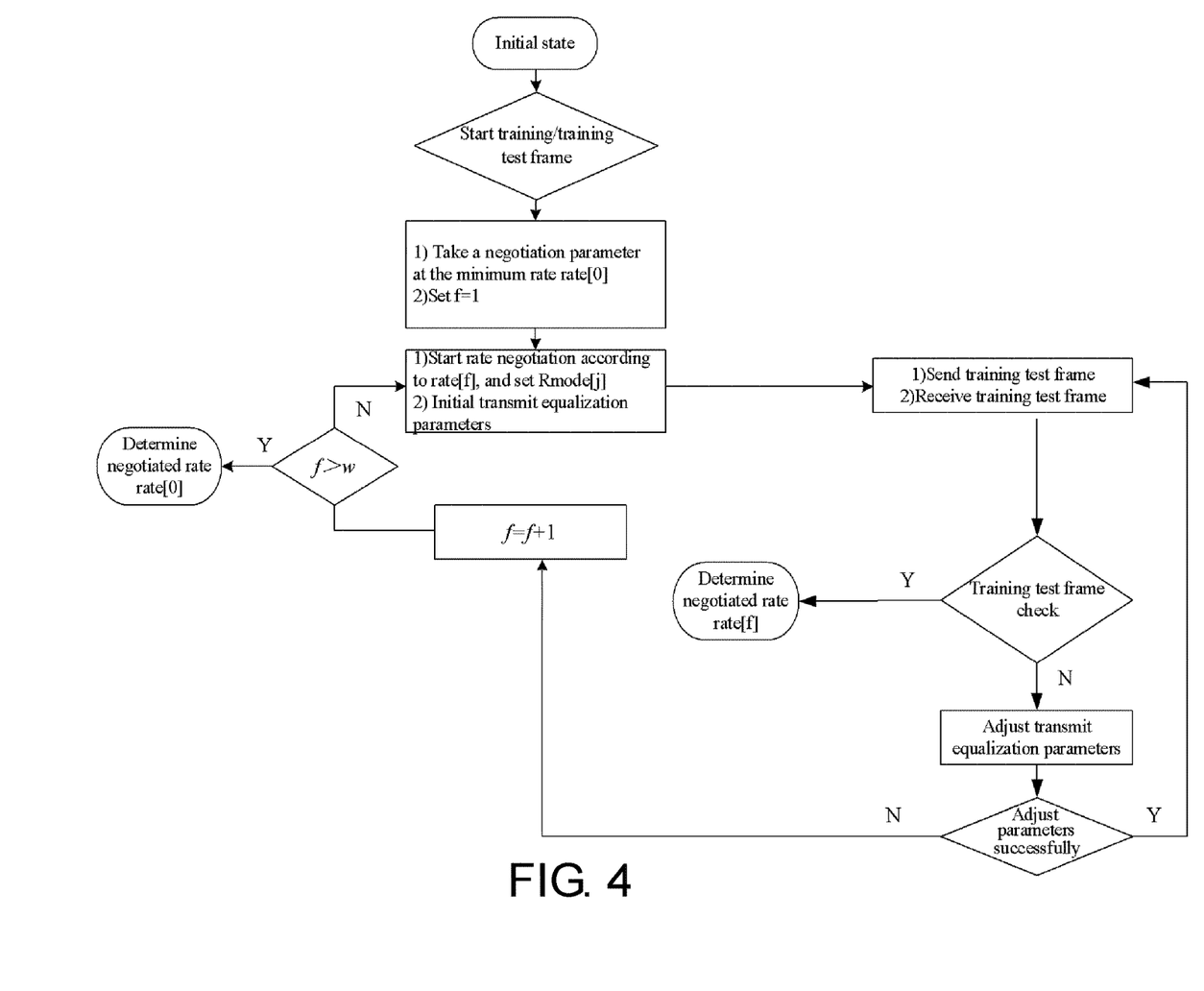
FIG. 4 is a flow chart of equalization parameter training and rate negotiation of a port initialization unit in an application of this invention.

FIG. 4 is a flow chart of equalization parameter training and rate negotiation of a port initialization unit in an application of this invention. A port initialization unit j takes the following steps to complete equalization parameter training and port rate negotiation of the output links in the jth port:

step 1): enter an initial state after power-on reset, or proceed to step 2) for parameter training and rate negotiation if a software start training command is received or the rxdata[(j−1)m+1: (j−1)m+m] received from the SERDES element are training test frames;

step 2): take a minimum rate rate[0] to exchange negotiation parameters, with the rate at least comprising w transmission rates supported by the j port, and w being a natural number; record the w transmission rates rate[f] supported by the j port, with 1≤f≤w and f being a natural number, rank the rate[f] in a rate decreasing order, that is, if u≤v, the rate[u]≥rate[v], with rate[0] being the minimum rate supported by the j port; and set f=1 after exchanging the parameters, and proceed to step 3);

step 3): set a rate configuration register Rmode[j] according to the rate rate[f], and send to the LANE_TXCLK element; and then initialize equalization parameters and proceed to step 4);

step 4): send the training test frames according to the valid data signals txdata_i[(j−1)m+1: (j−1)m+m], and receive the training test frames from the rxdata[(j−1)m+1: (j−1)m+m]; and determine the negotiation rate rate[f] and transmitting end equalization parameters if the received training test frames pass the check, and end the whole process; or proceed to step 5) if the training test frames fail to pass the check;

step 5: adjust the transmitting equalization parameters; try a next equalization parameter for successful adjustment, and go back to the step 4), otherwise all the equalization parameters used by the rate rate[f] are invalid, and proceed to step 6); and step 6): try a next rate to continue negotiation, with f=f+1; if f>w, it indicates that only the minimum rate rate[0] succeeds. Determine the negotiation rate rate[0], and end the whole process; or try next rate and proceed to the step 3).

Figure 5:
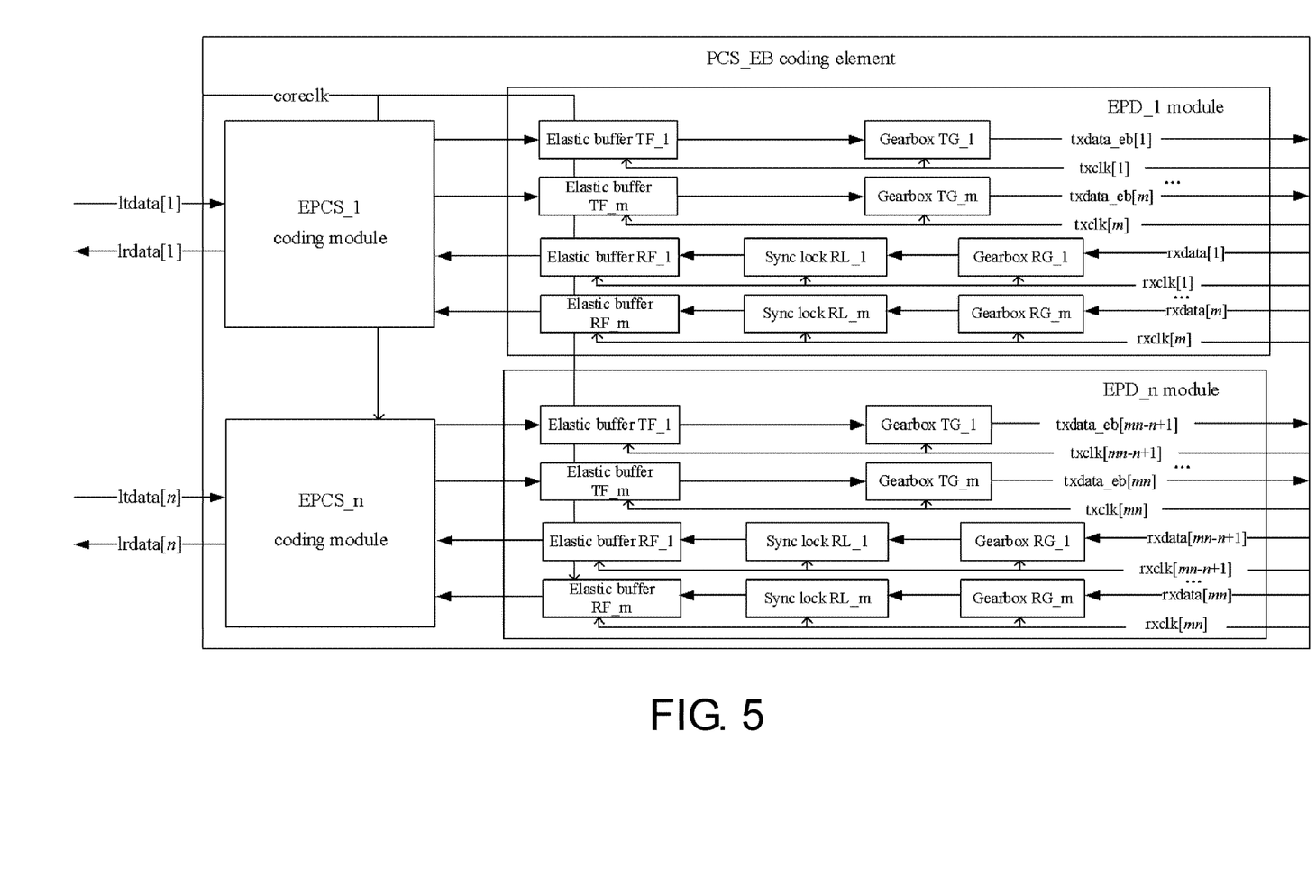
FIG. 5 is a structural diagram of a PCS_EB coding element in an application of this invention.

FIG. 5 is a structural diagram of a PCS_EB coding element in an application of this invention, and the PCS_EB coding element consists of n EPD modules and n EPCS modules. For any port j, only one of the PCS_EB coding element and the PCS_AF coding element works at any time.

A jth EPD module is recorded as EPD_j module, and is responsible for data width adaptation and valid data monitoring of the port j. The EPD_j module is connected with the LANE_TXCLK element, the SERDES element, the SERDES initialization element and a jth EPCS module (recorded as EPCS_j module). The EPD_j module comprises m elastic buffers TF_1, ..., TF_r, ..., TF_m, m gearboxes TG_1, ..., TG_r, ..., TG_m, m elastic buffers RF_1, ..., RF_r, ..., RF_m, m sync locks and m gearboxes RG_1, ..., RG_r, ..., RG_m, 1≤r≤m, and r is a natural number. In a sending direction, the EPD module receives transmit clocks txclk[(j−1)m+1: (j−1)m+m] from the LANE_TXCLK element, and sends the clocks txclk[j*m+r] to the gearbox TG_r and the elastic buffer TF_r. A write port of the elastic buffer TF_r works in the core clock domain coreclk, and receives m data of the j port from the EPCS_j module. The TF_r dynamically inserts/deletes idle characters when necessary. A read port of the elastic buffer TF_r works in the txclk[(j−1)m+r], reads out data and sends to the gearbox TG_r. The gearbox TG_r of the EPD_j module receives data from the elastic buffer TF_r, and sends data txdata_eb[(j−1)m+r] to the SERDES initialization element after width conversion. In a receiving direction, the EPD_j module receives data rxdata[(j−1)m+1: (j−1)m+m] on the port j and recovery clocks rxclk[(j−1)m+1: (j−1)m+m] from the SERDES element, send rxclk[(j−1)m+r] to the gearbox RG_r, a lock unit RL_r and the elastic buffer RF_r. The gearbox RG_r receives data rxdata[(j−1)m+r] from the SERDES element, and sends the data to the lock unit RL_r after width conversion. The lock unit RL_r determines that the link is locked, and then sends the data to the elastic buffer RF_r. An write port of the elastic buffer RF_r works in the rxclk[(j−1)m+r] clock domain. The elastic buffer RF_r dynamically inserts/deletes idle characters when necessary. A read port of the elastic buffer RF_r works in the core clock domain coreclk, reads out valid data and sends to the EPCS_j module.

The EPCS_j module is connected with the EPD_j module, and works in the core clock domain coreclk. The EPCS_j module receives input message ltdata[j] of the link layer for 66B/64B coding or FEC coding, and then sends m valid data of the port j to the TF_1 to TF_m of the EPD module. The EPCS_j module receives m valid data from the RF_1 to RF_m in the EPD_j module for 66B/64B decoding or FEC decoding, and then outputs message lrdata[j] to the link layer.

Figure 6:
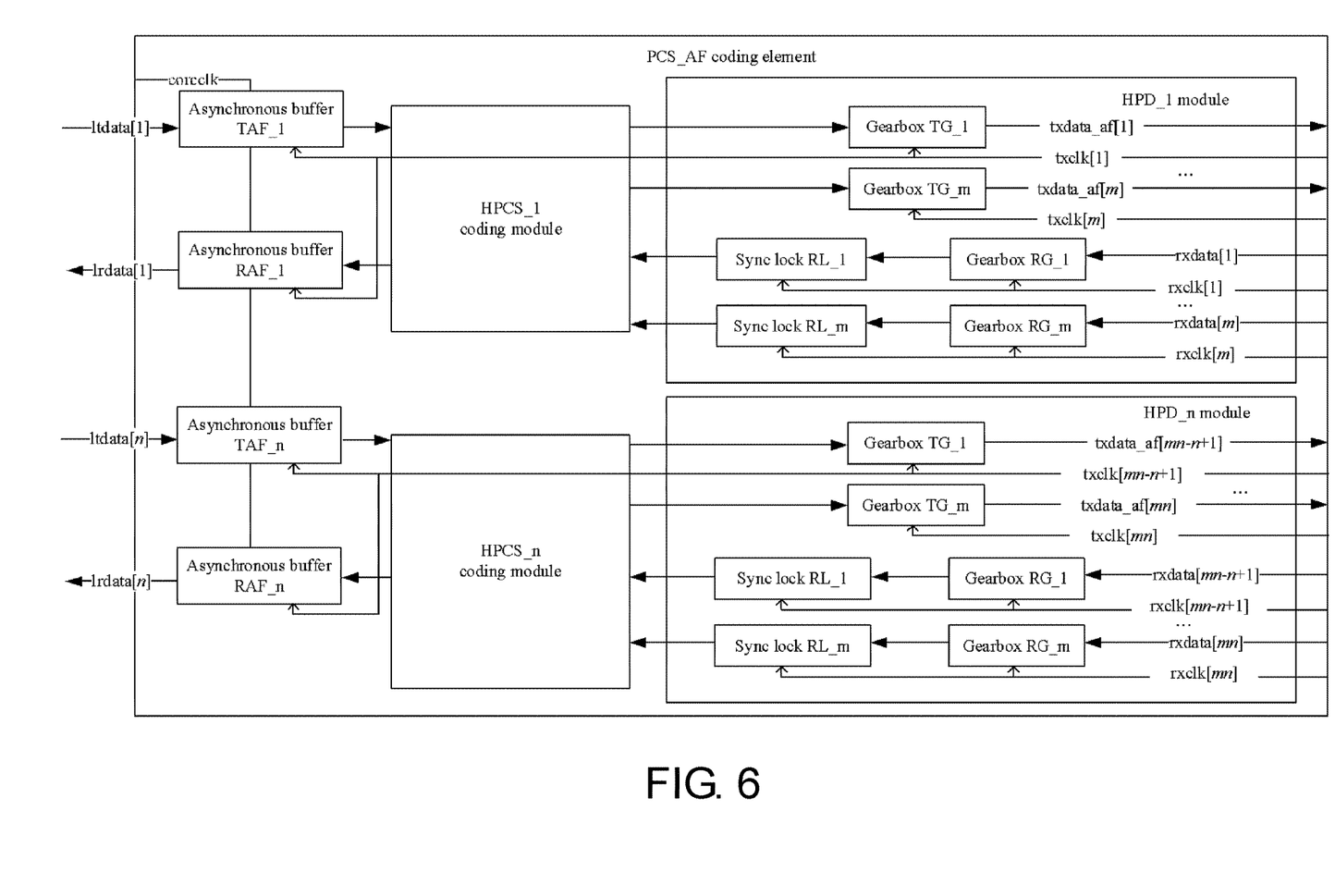
FIG. 6 is a structural diagram of a PCS_AF coding element in an application of this invention.

FIG. 6 is a structural diagram of a PCS_AF coding element in an application of this invention. The PCS_AF coding element consists of n HPD modules, n HPCS modules, n transmit asynchronous buffers TAF and n receive asynchronous buffers RAF. For any port j, only one of the PCS_AF coding element and the PCS_EB coding element works at any time.

A jth HPD module is recorded as HPD_j module, and is connected with the LANE_TXCLK element, ajth HPCS module (recorded as HPCS_j module), the SERDES initialization element and the SERDES element. The HPD_j module comprises m gearboxes TG_1, . . . , TG_r, . . . , TG_m, m sync locks RL_1, . . . , RL_r, . . . , RL_m, and m gearboxes RG_1, . . . , RG_r, . . . , RG_m, 1≤r≤m, and r is a natural number. The HPD_j module receives transmit clocks txclk[(j−1)m+1: (j−1)m+m] from the LANE_TXCLK element, sends transmit clocks txclk[(j−1)m+1] to the HPCS_j module, and transmit clocks txclk[(j−1)m+r] to m gearboxes TG_r, r=1, . . . , m. At that time, input Rmode[j] of the LANE_TXCLK element equals 1, therefore, the txclk [(j−1)m+r] and txclk [(j−1)m+1] are identical clocks for any r (1 because r≤m). The gearbox TG_r receives data from the HPCS module, and sends data txdata_af[(j−1)m+r] to the SERDES initialization element after width conversion. The HPD_j module receives data rxdata[(j−1)m+1: (j−1)m+m] and recovery clocks rxclk[(j−1)m+1: (j−1)m+m] from the SERDES element, and sends rxclk[(j−1)m+r] to the gearbox RG_r and the lock unit RL_r. The gearbox RG_r receives data rxdata[(j−1)m+r] from the SERDES element, and sends the data to the lock unit RL_r after width conversion. The lock unit RL_r determines that the link is locked, and then sends the data to ajth HPCS_j module.

The HPCS_j module works in txclk[(j−1)m+1] clock domain, and is connected with the HPD_j module, the asynchronous buffer TAF_j and the asynchronous buffer RAF_j. The HPCS_j module reads messages from the asynchronous buffer TAF_j for 66B/64B or FEC coding, and sends coding data to the gearboxes TG_1 to TG_m of the HPD_j module; receives link lock valid data from the sync locks RL_1 to RL_m of the HPD_j module for 66B/64B or FEC decoding, and then writes in the asynchronous buffer RAF_j.

A write port of the asynchronous buffer TAF_j works in the core clock domain coreclk, and is connected with the link layer and the HPCS_j module. The asynchronous buffer TAF_j receives message data ltdata[j] from the link layer for caching. A read port of the asynchronous buffer TAF_j works in the txclk[(j−1)m+1] clock domain, reads the message data ltdata[j] and sends to the HPCS_j module for coding.

A write port of the asynchronous buffer RAF_j works in the txclk[(j−1)m+1] clock domain, and is connected with the link layer and the HPCS_j module. It receives message data from the HPCS_j module. A read port of the asynchronous buffer RAF_j works in the core clock domain coreclk, and sends the message data to an upper link layer as long as the buffer is non-null. Frequency of the core clock coreclk is higher than that of the txclk/rxclk, therefore, the asynchronous buffers TAF_j and RAF_j read out data without dynamically inserting or deleting idle characters as long as the buffer is non-null, which reduces message transmission delay.

In order to converge dual network namely a dedicated high speed network and an Ethernet network, simultaneously integrate two network interconnection interfaces inside the same chip, and solve problems of clock generation, data path and initialization function sharing caused by coexistence of two network interconnection interface controllers, this invention provides a multimode interconnection interface controller for a converged network, which supports switching between two physical layer coding elements by configuring a port mode register; provides a shared SERDES initialization element which automatically completes link training and rate negotiation; provides an elastic buffer-based physical layer coding element (PCS_EB coding element) to provides more universality and flexibility for interconnection chip design; and provides an asynchronous buffer-based physical layer coding element (PCS_AF coding element) to reduce message penetration delay. Through flexible configuration, this invention makes single chips meet transmission requirements of a dedicated high speed network and an Ethernet network.

Compared with the current technology, the multimode interconnection interface controller for the converged network of this invention has the following advantages:

1. The multimode interconnection interface controller can provide two flexible SERDES transmit clock solution by means of configuration registers, and support two physical coding elements respectively. The multimode interconnection interface controller is integrated in a single chip, and can support simultaneous interconnection of data center Ethernet and high performance computing high speed network, saving cost and effectively supporting various applications such as cloud computing, scientific computing, intelligent computing and machine learning.

2. The multimode interconnection interface controller integrates the SERDES initialization element, can automatically adjust transmit equalization parameters to optimize quality of high speed signals under various link states, and can complete automatic negotiation of the maximum transmission rate between ports.

3. The multimode interconnection interface controller integrates the PPCS_EB coding element, and has no constraint between the core clock and the SERDES transmit/receive clock, providing more universality and flexibility for the design of interconnection chips.

4. The multimode interconnection interface controller integrates the PCS_AF coding element. On the premise that working frequency of the core clock is slightly higher than that of the SERDES transmit/receive clock, the asynchronous buffer is used instead of the elastic buffer to complete clock domain conversion, thus reducing message penetration delay.

The above are only preferred applications of this invention, and the protection scope of this invention is not limited to the applications mentioned above. The technical solutions under the ideas of this invention fall into the protection scope of the invention. It should be pointed out that, for an ordinary person skilled in the art, some improvements and modifications without deviating from the principle of the invention shall be deemed as the protection scope of this invention.

What is claimed is:

1. A multimode interconnection interface controller for a converged network, comprising:
 a SERDES (Serializer/Deserializer) element responsible for serial/parallel conversion,
 a LANE_TXCLK element responsible for generating a transmit clock,
 a SERDES initialization element responsible for link training and rate negotiation, and
 a PCS_EB (Physical Coding Sublayer Elastic Buffer) coding element and a PCS_AF (Physical Coding Sublayer Asynchronous Buffer) coding element responsible for physical layer coding of messages;
 for any port, only one of the PCS_EB coding element and the PCS_AF coding element works at any time;
 as an entry of the multimode interconnection interface controller for the converged network, the SERDES element externally connects a reference clock refclk, mn input links rx[1:mn] and mn output links tx[1:mn], wherein m and n are positive integers; the SERDES element internally connects the LANE_TXCLK element, the SERDES initialization element, the PCS_EB coding element and the PCS_AF coding element, and the SERDES element is responsible for serial/parallel and parallel/serial conversion of data received and sent by m ports, wherein rx[1:mn] is a simplified representation of mn arrays rx[1] . . . rx[mn], tx[1:mn] is a simplified representation of mn arrays tx[1] . . . tx[mn], and array abbreviation [1:mn] is a simplified representation of 1 to mn;
 the SERDES element receives the reference clock refclk from an external crystal oscillator, generates a high frequency clock htxclk and an intermediate frequency clock ltxclk, and sends the high frequency clock htxclk and the intermediate frequency clock ltxclk to the LANE_TXCLK element; the SERDES element receives valid data txdata[1:mn] of mn links in n ports from the SERDES initialization element, receives mn transmit clocks txclk[1:mn] from the LANE_TXCLK element, samples the txdata[i] by means of the txclk[i], completes the parallel/serial conversion and generates transmit serial data tx[i], and outputs the transmit serial data tx[i], wherein i is a positive integer, and i≤mn;
 the SERDES element receives the serial data from the mn input links rx[1:mn], performs serial/parallel conversion recovery to generate receive data rxdata[1:mn] and recovery clocks rxclk[1:mn], and sends the receive data rxdata[1:mn] and the recovery clocks rxclk[1:mn] to the SERDES initialization element, the PCS_EB coding element and the PCS_AF coding element;
 the LANE_TXCLK element is connected with the SERDES initialization element, the PCS_EB coding element, the PCS_AF coding element and the SERDES element, and is responsible for generating the transmit clocks txclk[1:mn] on the mn links in the n ports; the LANE_TXCLK element receives the HF transmit clock htxclk and the IF transmit block ltxclk from the SERDES element, receives rate configuration register values Rmode[1:n] from the SERDES initialization element, receives mode configuration register values Pmode[1:n] from a global register, generates the transmit clocks txclk[1:mn] on the mn links in the n ports, and sends the transmit clocks txclk[1:mn] to the SERDES initialization element, the PCS_EB coding element, the PCS_AF coding element and the SERDES element;
 the SERDES initialization element is connected with the SERDES element, the PCS_EB coding element, the PCS_AF coding element and the LANE_TXCLK element, and responsible for equalization parameter training and rate negotiation of the mn output links in n ports, generates the valid data txdata[1:mn] of the mn output links according to the mode configuration register values Pmode[1:n] and sends data to the SERDES element, thus realizing initialization function and data path sharing;
 the SERDES initialization element receives the mode configuration register values Pmode[1:n] from the global register, generates the rate configuration register values Rmode[1:n], and sends the rate configuration register values Rmode[1:n] values to the LANE_TXCLK element;
 the SERDES initialization element receives the data rxdata[1:mn] and the recovery clocks rxclk[1:mn] from the SERDES element to perform parameter training and rate negotiation, receives the transmit clocks txclk[1:mn] from the LANE_TXCLK element, receives valid data txdata_eb[1:inn] from the PCS_EB coding element, receives valid data txdata_af[1:mn] from the PCS_AF coding element, generates the valid data txdata[1:mn] and sends the valid data txdatal[1:mn] to the SERDES element;
 the PCS_EB coding element is connected with the LANE_TXCLK element, the SERDES element and SERDES initialization element, and is responsible for encoding the valid data rxdata[1:mn] of the mn links in the n ports; the PCS_EB coding element receives the txclk[1:mn] from the LANE_TXCLK element, receives a core clock coreclk from outside, receives the recovery clocks rxclk[1:mn] from the SERDES element, and uses elastic buffer to complete clock domain crossing data transmission between the core clock coreclk, the transmit clocks txclk[1:mn] and the recovery clocks rxclk[1:mn]; the PCS_EB coding element receive message data ltdata[1:n] of then ports from link layer, and sends the txdata_eb[1:mn] to the SERDES initialization element after encoding by physical layer; the PCS_EB coding element receives the data rxdata[1:mn] and the recovery clocks rxclk[1:mn] from the SERDES element, and sends lrdata[1:n] message data to the link layer after decoding by the physical layer;
 the PCS_AF coding element is connected with the LANE_TXCLK element, the SERDES element and the SERDES initialization element, and is responsible for encoding the valid data rxdata[1:mn] of the inn links in the n ports; the PCS_AF coding element requires core frequency coreclk to be not less than txclk/rxclk frequency, and requires the transmit clocks txclk[1:mn] of them links in the same port to have identical phase; the PCS_AF coding element receives the txclk[1:mn] from the LANE_TXCLK element, receives the core clock coreclk from the outside, receives the recovery clocks rxclk[1:mn] from the SERDES element, and uses asynchronous buffer to complete the clock domain crossing data transmission between the core clock coreclk, the transmit clocks txclk[1:mn] and the recovery clocks rxclk[1:mn]; the PCS_AF coding element receives the message data ltdata[1:n] of the n ports from the link layer, and sends the txdata_af[1:mn] to the SERDES initialization element after encoding by the physical layer; the PCS_AF coding element receives the data rxdata[1:mn] and the recovery clocks rxclk[1:mn] from the SERDES element, and sends the lrdata[1:n] message data to the link layer after decoding by the physical layer.

2. The multimode interconnection interface controller for the converged network as recited in claim 1, wherein the SERDES initialization element comprises n port initialization units, n mode multiplexer units DMUX1 to DMUXn, and n initialization multiplexer units IMUX1 to IMUXn;

a jth port initialization unit is connected with the LANE_TXCLK element, the SERDES element and a multiplexer unit IMUXj, receives m transmit clocks txclk[(j−1)m+1: (j−1)m+m] from the LANE_TXCLK element, sends training test frame data txdata_i[(j−1)m+1: (j−1)m+m] to the initialization multiplexer unit IMUXj after processing by the port, and sends a rate configuration register value Rmode[j] to the LANE_TXCLK element, wherein j is an integer, and 1≤j≤n;

the jth port initialization unit receives data rxdata[(j−1)m+1:(j−1)m+m] and recovery clocks rxclk[(j−1)m+1: (j−1)m+m] from the SERDES element, and sends an initialization signal init[j] to the initialization multiplexer unit IMUXj after receiving training test frame check;

the jth mode multiplexer unit DMUXj is connected with the PCS_EB coding element, the PCS_AF coding element and the jth initialization multiplexer unit IMUXj of the n initialization multiplexer units IMUX1 to IMUXn, receives valid data signals txdata_eb[(j−1)m+1:(j−1)m+m] from the PCS_EB coding element, receives valid data signals txdata_ef[(j−1)m+1: (j−1)m+m] from the PCS_AF coding element, and generates and sends temporary data to the IMUXj according to selection of a port configuration register Pmode[j];

the jth mode initialization multiplexer unit IMUXj is connected with the jth mode multiplexer unit DMUXj, the jth port initialization unit and the SERDES element, receives the temporary data from the DMUXj unit, receives the training test frame data txdata_i[(j−1)m+1: (j−1)m+m] and init[j] from the jth port initialization unit, generates valid data signals txdata[(j−1)m+1: (j−1)m+m] according to selection of a init[j] value, and sends the valid data signals txdata[(j−1)m+1: (j−1)m+m] to the SERDES element.

3. The multimode interconnection interface controller for a converged network as recited in claim 2, wherein the port initialization unit j takes the following steps to complete equalization parameter training and port rate negotiation of output links in the jth port:

step 1): enter an initial state after power-on reset, or proceed to step 2) for parameter training and rate negotiation if a software start training command is received or the rxdata[(j−1)m+1: (j−1)m+m] received from the SERDES element are training test frames;

step 2): take a minimum rate rate[0] to exchange negotiation parameters, with a rate at least comprising w transmission rates supported by the jth port, and w being a natural number; record w transmission rates rate[f] supported by the jth port, with 1≤f≤w and f being a natural number, rank the rate[f] in a rate decreasing order, that is, if u≤v, the rate[u]≥rate[v], with rate[0] being the minimum rate supported by the jth port; and set f=1 after exchanging parameters, and proceed to step 3);

step 3): set a rate configuration register Rmode[j] according to rate rate[f], and send the rate configuration register Rmode[j] to the LANE_TXCLK element; and then initialize equalization parameters and proceeding to step 4);

step 4): send the training test frames according to the valid data signals txdata_i[(j−1)m+1: (j−1)m+m], and receive the training test frames from the rxdata[(j−1)m+1: (j−1)m+m]; and determine negotiation rate rate[f] and transmit end equalization parameters if the received training test frames pass check, and end the whole process; or proceed to step 5) if the training test frames fail to pass the check;

step 5): adjust the transmitting equalization parameters; try a next equalization parameter for successful adjustment, and go back to the step 4), otherwise all the equalization parameters used by the rate rate[f] are invalid, and proceed to step 6); and step 6): try a next rate to continue negotiation, with f=f+1; if f>w, only the minimum rate rate[0] succeeds, determine negotiation rate rate[0], and end the whole process; or try the next rate and proceed to the step 3).

4. The multimode interconnection interface controller for a converged network as recited in claim 1, wherein the LANE_TXCLK element consists of mn Txclk rate adjustment units and n Txclk mode adjustment units, and every m Txclkrate adjustment units correspond to a Txclk mode adjustment unit;

a kth Txclk rate adjustment unit generates the temporary transmit clock txclk_t[k] of a link k according to the rate configuration register values Rmode[1:n] from the SERDES initialization element, wherein 1≤k≤m, and k is an integer; the kth Txclk rate adjustment unit is connected with the SERDES element and an lth Txclk mode adjustment unit, wherein l⌈k/m⌉, and consists of 6 frequency dividing units DIV_p1 to DIV_p6 and 7 clock multiplexer units RMux1 to RMux7;

the frequency dividing units DIV_p1, DIV_p2 and DIV_p3 respectively receive the high frequency clock htxclk from the SERDES element, generate frequency dividing clocks after frequency dividing by p1, p2 and p3, and respectively send to an OSC0 end of the RMux1 unit, and OSC1 ends of the RMux1 unit and the RMux3 unit, wherein p1, p2 and p3 are integers greater than 2, and the OSC0 and OSC1 are crystal oscillator and oscillator pins;

the frequency dividing units DIV_p4, DIV_p5 and DIV_p6 respectively receive the intermediate frequency clock ltxclk from the SERDES element, generate frequency dividing clocks after frequency dividing by p4, p5 and p6, and send to an OSC0 end of the RMux2 unit, and OSC1 ends of the RMux2 unit and the RMux4 unit, and p4, p5 and p6 are integers greater than 2;

the RMux1 unit receives p1 frequency dividing clock and p2 frequency dividing clock from the DIV_p1, generates Txclk temporary clock 1 according to selection of a Rmode[l] value, and sends to the OSC0 end of the RMux3 unit;

the RMux3 unit receives the Txclk temporary clock 1 and p3 frequency dividing clock from the DIV_p3, generates Txclk temporary clock 2 according to selection of the Rmode[l] value, and sends to the OSC0 end of the RMux5 unit;

the RMux5 unit receives the Txclk temporary clock 2 and the htxclk clock from the SERDES element, generates a temporary clock 3 according to selection of the Rmode[l] value, and sends to the OSC0 end of the RMux7 unit;

the RMux2 unit, the RMux4 unit and the RMux6 unit generate a temporary clock 6 according to selection of the Rmode[l] value, and send to the OSC1 end of the RMux7 unit;

at last; the RMux7 unit generates a temporary transmit clock txclk_t[k] of the ith link according to selection of the Rmode[l] value and send to the lth Txclk mode adjustment unit;

the Txclk rate adjustment unit can generate 8 temporary transmit clock frequencies htxclk, htxclk/p1, htxclk/p2, htxclk/p3 and ltxclk, ltxclk/p4, ltxclk/p5 and ltxclk/p6 according to specific value Rmode[l] of the rate configuration register;

the lth Txclk mode adjustment unit generates m transmit clocks txclk[(l−1)m+1: (l−1)m+m] in port 1 according to the mode configuration register value Pmode[l], and sends the m transmit clocks txclk[(l−1)m+1: (l−1)m+m] to the SERDES element, the SERDES initialization element, the PCS_EB coding element and the PCS_AF coding element;

the PCS_EB coding element allows different phases for the transmit clocks of the m links in the same port, while the PCS_AF coding element requires the identical phase for the transmit clocks of the m links in the same port, therefore, the Txclk mode adjustment unit generates different transmit clocks for two requirements respectively;

the lth Txclk mode adjustment unit consists of clock multiplexer units PMux2 to PMuxm;

the lth Txclk mode adjustment unit receives the temporary transmit clocks from the (l−1)m+1 to (l−1) m+m TXCLK rate adjustment unit, which is recorded as txclk_t[(l−1)m+1: (l−1)m+m];

if Pmode[l]=1 means Ethernet mode, and the PMux2 to PMuxm units select txclk_t[(l−1)m+1: (l−1)m+m] as the m transmit clocks txclk[(l−1)m+1: (l−1)m+m] of the 1 port;

if Pmode[l]=0 means the dedicated high speed network mode, and the PMux2 to PMuxm units select txclk_t [(l−1)m+1] to copy m copies as the m transmit clocks txclk[(l−1)m+1: (l−1)m+m] of the 1 port;

to this end, the Txclk mode adjustment unit selects whether the m transmit clocks in the same, port are in-phase clocks according to selection of the Pmode[l].

5. The multimode interconnection interface controller for a converged network as recited in claim 1, wherein the PCS_EB coding element consists of n EPD (Ethernet Port Data) modules and n EPCS (Ethernet Physical Coding Sublayer) modules;

a jth EPD module is recorded as EPD_j module, and is responsible for data width adaptation and valid data monitoring of port j;

the EPD_j module is connected with the LANE_TXCLK element, the SERDES element, the SERDES initialization element and a jth EPCS module recorded as EPCS_j module;

the EPD_j module comprises m elastic buffers TF_1, . . . , TF_r, . . . , TF_m, m gearboxes TG_1, . . . , TG_r, . . . , TG_m, m elastic buffers RF_1, . . . , RF_r, . . . , RF_m, m sync locks RL_1, . . . , RL_r, . . . , RL_m, and m gearboxes RG_1, . . . , RG_r, . . . , RG_m, wherein 1≤r≤m, and r is a natural number;

in a sending direction, the EPD_j module receives transmit clocks txclk[(j−1)m+1: (j−1)m+m] from the LANE_TXCLK element, and sends the clocks txclk[j*m+r] to the gearbox TG_r and the elastic buffer TF_r;

a write port of the elastic buffer TF_r works in core clock domain coreclk, and receives m data of the port j from the EPCS_j module;

the TF_r dynamically inserts/deletes idle characters when necessary;

a read port of the elastic buffer TF_r works in txclk[(j−1)m+r], reads out data and sends to the gearbox TG_r;

the gearbox TG_r of the EPD_j module receives data from the elastic buffer TF_r, and sends data txdata_eb [(j−1)m+r] to the SERDES initialization element after width conversion;

in a receiving direction, the EPD_j module receives data rxdata[(j−1)m+1: (j−1)m+m] on the port j and recovery clocks rxclk[(j−1)m+1: (j−1)m+m] from the SERDES element, send rxclk[(j−1)m+r] to the gearbox RG_r, a lock unit RL_r and the elastic buffer RF_r;

the gearbox RG_r receives data rxdata[(j−1)m+r] from the SERDES element, and sends the data to the lock unit RL_r after width conversion;

the lock unit RL_r determines that a link of the mn links is locked, and then sends the data to the elastic buffer RF_r;

a write port of the elastic buffer RF_r works in rxclk[(j−1)m+r] clock domain;

the elastic buffer RF_r dynamically inserts/deletes idle characters when necessary;

a read port of the elastic buffer RF_r works in the core clock domain coreclk, reads out valid data and sends to the EPCS_j module;

the EPCS_j module is connected with the EPD_j module, and works in the core clock domain coreclk;

the EPCS_j module receives input message ltdata[j] of the link layer for 66B/64B coding or FEC coding, and then sends m valid data of the port j to the TF_1 to TF_m of the EPD_j module;

the EPCS_j module receives m valid data from the RF_1 to RF_m in the EPD_j module for the 66B/64B decoding or the FEC decoding, and then outputs message lrdata[j] to the link layer.

6. The multimode interconnection interface controller for a converged network as recited in claim 1, wherein the PCS_AF coding element consists of n HPD (Highspeed Port Data) modules, n HPCS (Highspeed Physical Coding Sublayer) modules, n transmit asynchronous buffers TAF and n receive asynchronous buffers RAF;

a jth HPD module is recorded as HPD_j module, and is connected with the LANE_TXCLK element, a jth HPCS module (recorded as HPCS_j module), the SERDES initialization element and the SERDES element;

the HPD_j module comprises m gearboxes TG_1, ..., TG_r, ..., TG_m, m sync locks RL_1, ..., RL_r, ..., RL_m, and m gearboxes RG_1, ..., RG_r, ..., RG_m, wherein $1 \leq r \leq m$, r is a natural number;

the HPD_j module receives transmit clocks txclk[(j−1)m+1: (j−1)m+m] from the LANE_TXCLK element, sends the transmit clocks txclk[(j−1)m+1] to the HPCS_j module, and transmit clocks txclk[(j−1)m+r] to m gearboxes TG_r, wherein r=1, ..., m;

at that time, input Rmode[j] of the LANE_TXCLK element equals 1, therefore, txclk[(j−1)m+r] and the txclk[(j−1)m+1] are identical clocks for any r, wherein $1 \leq r \leq m$;

the gearbox TG_r receives data from the HPCS module, and sends data txdata_af[(j−1)m+r] to the SERDES initialization element after width conversion;

the HPD_j module receives data rxdata[(j−1)m+1: (j−1)m+m] and recovery clocks rxclk[(j−1)m+1: (j−1)m+m] from the SERDES element, and sends rxclk[(j−1)m+r] to the gearbox RG_r and lock unit RL_r;

the gearbox RG_r receives data rxdata[(j−1)m+r] from the SERDES element, and sends the data to the lock unit RL_r after width conversion;

the lock unit RL_r determines that a link of the mn links is locked, and then sends the data to a jth HPCS_j module;

the HPCS_j module works in txclk[(j−1)m+1] clock domain, and is connected with the HPD_j module, the asynchronous buffer TAF_j and the asynchronous buffer RAF_j;

the HPCS_j module reads messages from the asynchronous buffer TAF_j for 66B/64B coding or FEC coding, and sends coding data to the gearboxes TG_1 to TG_m of the HPD_j module; and receives link lock valid data from the sync locks RL_1 to RL_m of the HPD_j module for the 66B/64B decoding or the FEC decoding, and then writes in the asynchronous buffer RAF_j;

a write port of the asynchronous buffer TAF_j works in core clock domain coreclk, and is connected with the link layer and the HPCS_j module; the asynchronous buffer TAF_j receives message data ltdata[j] from the link layer for caching;

a read port of the asynchronous buffer TAF_j works in txclk[(j−1)m+1] clock domain, reads the message data ltdata[j] and sends to the HPCS_j module for coding;

a write port of the asynchronous buffer RAF_j works in the txclk[(j−1)m+1] clock domain, and is connected with the link layer and the HPCS_j module, and receives message data from the HPCS_j module;

a read port of the asynchronous buffer RAF_j works in the core clock domain coreclk, and sends the message data to an upper link layer as long as the buffer is non-null.

* * * * *